C. C. Harriman,
Bread Machine.
Nº 62,628.   Patented Mar. 5, 1867.
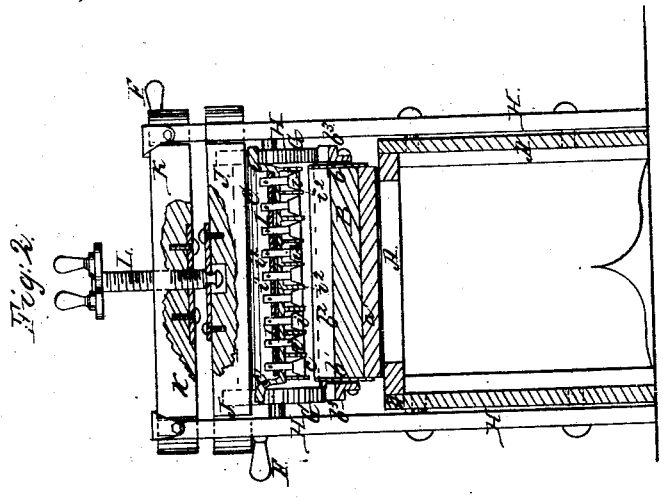
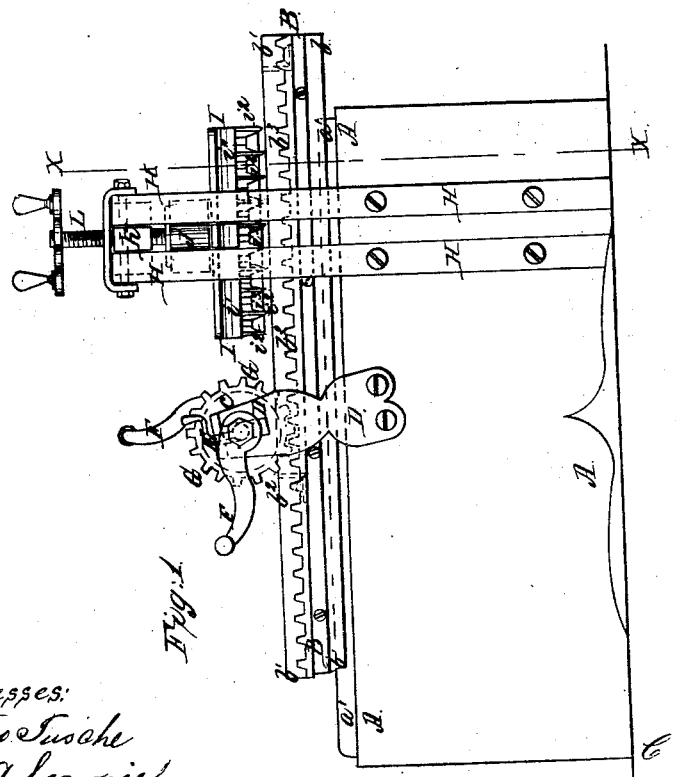
Witnesses:
Theo Tusche
J. A. Service
Inventor:
C. C. Harriman
Per Munn & Co
Attorneys

United States Patent Office.

C. C. HARRIMAN, OF WARNER, NEW HAMPSHIRE, ASSIGNOR TO HIMSELF AND JOHN DAVIS, 3D, OF SAME PLACE.

*Letters Patent No. 62,628, dated March 5, 1867.*

IMPROVED CORN-CAKE MACHINE.

*The Schedule referred to in these Letters Patent and making part of the same.*

TO ALL WHOM IT MAY CONCERN:

Be it known that I, C. C. HARRIMAN, of Warner, in the county of Merrimack, and State of New Hampshire, have invented a new and improved Corn-Cake Machine; and I do hereby declare that the following is a full, clear, and exact description thereof, which will enable those skilled in the art to make and use the same, reference being had to the accompanying drawings, forming part of this specification, in which—

Figure 1 is a side view of my improved machine.

Figure 2 is a vertical cross-section of the same taken through the line $x$ $x$, fig. 1.

Similar letters of reference indicate corresponding parts.

My invention has for its object to furnish a neat and convenient machine for cutting out cakes of uniform size and thickness in batches of one hundred, two hundred or more, as may be desired.

And it consists in the cutter formed by the combination of the solid knives and cast-iron followers with each other, and with the plate to which they are attached; in the combination of a roller having cog-wheels attached to its ends, and a sliding top or board, with each other and with the table or frame of the machine; in regulating the thickness of the cakes by means of set-screws acting upon the journals of the pressing roller, and in operating the cutter by means of a hand-screw; the whole being constructed and arranged as hereinafter more fully described.

A is the table or frame of the machine. B is the sliding top or board, which moves back and forth longitudinally with the table A, as it is operated by the roller C. The board B is kept in place upon the table A by side flanges $b^1$, which project downward and overlap the side edges of the top board $a^1$ of the table, and which project upward to form guards to keep the dough upon the said board B. $b^2$ are end or division pieces, one of which is placed at the forward end of the board B, and one or more of which are placed across the board at such points as will divide the board into spaces of such size as will give a sheet of dough large enough to cut one or two hundred cakes, as may be desired. $b^3$ are toothed racks attached to the edges of the board B, as shown in fig. 2. C is the roller, the journals of which work in slots formed in the supports D attached to the sides of the table A. This allows the entire weight of the roller to rest upon the dough being passed beneath it. The journals of the roller C are held down, and the thickness of the sheet of dough regulated by set-screws E passing down through the upper part of the supports D, so that their lower ends may rest upon the journals of said roller, as shown in fig. 1. F are cranks attached to the ends of the journals of the roller C, by which the said roller and the sliding board B are operated. G are gear-wheels attached to the ends of the roller C, the teeth of which mesh into the teeth of the racks $b^3$, so as to carry the board B forward or backward by the revolution of the said roller C. H are uprights attached to the sides of the table A, two on each side, so as to leave a narrow slot between the upper ends of each pair, as shown in fig. 1. I is the cutter, consisting of a plate $i^1$, knives $i^2$, and followers $i^3$. The plate $i^1$ is formed with upwardly projecting flanges by means of which it is secured to the beam J. The knives $i^2$ are formed solid, and are securely attached by their upper edges to the under side of the plate $i^1$ by soldering or in any other convenient manner. I prefer to form shallow grooves or channels in the under side of the plate $i^1$ for the reception of the upper edges of the knives $i^2$, as in this way I am able to secure the knives more neatly and firmly. The knives $i^2$ are so formed as to cut the cakes of the desired size and form; $i^3$ are the followers, the lower ends or heads of which are made of such a shape and size as to exactly fit into the spaces between the knives, as shown in figs. 1 and 2. The followers $i^3$ are formed with stems, which pass up through holes in the plate $i^1$, and they may be kept from dropping down too far by keys or pins passed through the upper ends of their stems, as shown in fig. 2. The said followers are made of cast iron, and should be of such a weight as to push the cut cakes from the knives as the cutter is raised. The faces of the followers $i^3$ may be made plain, or they may have any device formed upo them which it is desired to have impressed upon the cakes. The beam J to which the cutter I is attached is formed with tongues or tenons upon its ends, which enter and work in the slots formed between the upper ends of the uprights H. K is a beam having tenons or tongues formed upon its ends, which fit into the slots between the upper ends of the uprights H, and is secured in place by bolts passing through the said uprights, and through the said tongues, as shown in fig. 1. L is a hand-screw, the lower end of which is pivoted to the beam J, and which passes down through a nut secured to the beam K, so that by turning the screw L in one direction, the cutter is lowered to the board B to cut the cakes, and by turning it in the other direction, the cutter is raised again to allow the board to be again operated by the roller C.

Having thus described my invention, what I claim as new, and desire to secure by Letters Patent, is—

The adjustable roller C, provided with gear-wheels G, slotted supports D, set-scew E, sliding board B, cutter I, beam J sliding between the uprights H H, beam K, and hand-screw L, when all are constructed and arranged as herein set forth for the purpose specified.

C. C. HARRIMAN.

Witnesses:
  GEORGE UPTON,
  C. A. BENTON.